March 1, 1927.  G. L. PIERCE ET AL  1,618,994

PLAYING BALL

Filed March 3, 1926

Patented Mar. 1, 1927.

1,618,994

UNITED STATES PATENT OFFICE.

GEORGE L. PIERCE AND HENRY V. RAU, OF BROOKLYN, NEW YORK, ASSIGNORS TO A. G. SPALDING & BROS., OF NEW YORK, N. Y., A CORPORATION OF NEW JERSEY.

PLAYING BALL.

Application filed March 3, 1926. Serial No. 91,887.

The object of the present invention is to improve the construction of a playing ball of the type in which an inflatable rubber bladder is inclosed in a cover of leather or similar material.

The invention provides a bushing fastened to the cover, into which bushing a valved metallic stem formed on the bladder is adapted to be screwed. This construction keeps the bladder in proper position during inflation and renders later shifting of the bladder impossible.

The screw bushing may be attached to the cover at a point remote from the lacing and a small opening may be formed in the cover for access to the valved stem. The opening in the cover is closed by a cap screwed into the stem when the ball is in use. When the ball is thus constructed it is necessary to go through the laborious process of lacing the ball only when a new bladder is being inserted. The cover can then be tightly laced together before the ball is inflated, since the inflating stem is not inside the laced opening as in the ordinary practice. The stem can be reached quickly for inflation at any time by merely unscrewing the cap.

While we have disclosed a commercial embodiment of the invention for purposes of illustration, it should be understood that the structure may be modified in various ways without departure from the true spirit and scope of the invention as hereinafter defined and claimed.

Referring to the drawings.

Figure 4:
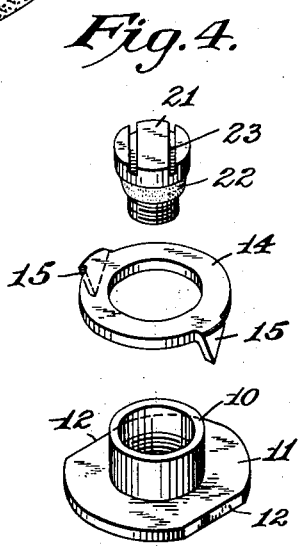
Figure 4 is an exploded view of the attaching bushing.

The bladder-attaching bushing 10, as shown in Fig. 4, is interiorly screw-threaded for part of its length and carries a flange 11 having two flat sides 12. The attaching bushing is secured to a patch of leather or other suitable material in any convenient manner. In the embodiment illustrated the bushing is inserted through an opening in patch 13, an anchor washer 14 is placed over the neck of the bushing and prongs 15 formed on the washer are forced through the leather patch and emerge alongside the flat sides 12 of the flange 11. The upper end of the neck of the bushing is then curled over against the anchor washer to form the flange 16. In this manner the bushing is firmly and non-rotatably attached to the patch 13.

The leather patch may be attached to the outer cover 17 of the ball wherever it is desired to locate the inflating stem. In the basket-ball illustrated in Fig. 1 the stem is located at a point opposite the lacing to balance the ball. Any suitable means may be used to secure the patch to the cover, such as the stitching 18, and one side of the patch may be caught under the stitches that form one of the seams of the ball. A small aperture 19 is made in the cover in alinement with the opening in the bushnig 10.

The valved inflating stem 20, which is threaded internally and externally, is clamped to the bladder 24 in a well-known manner.

Figure 1:
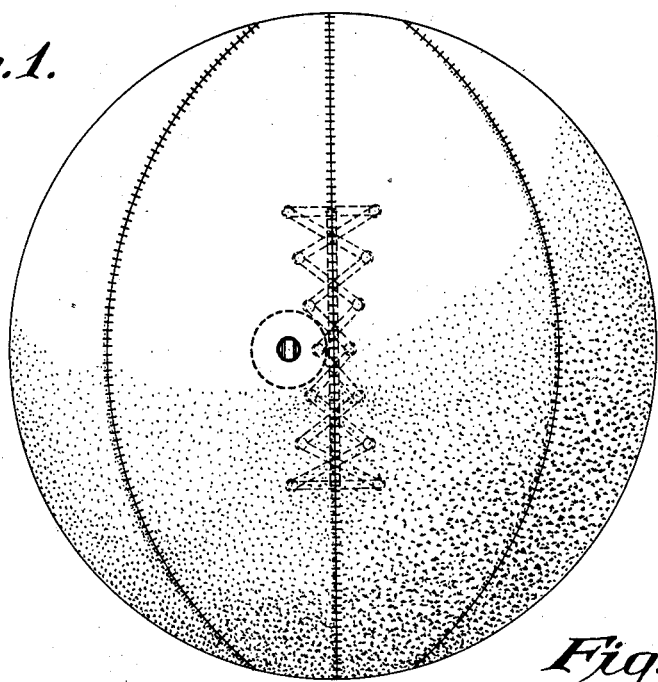
Figure 1 is a perspective of a basket ball embodying the invention.
Figure 2:
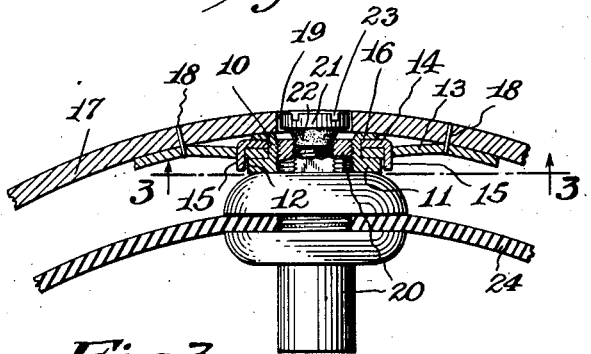
Figure 2 is a section through the bladder-attaching bushing.
Figure 3:
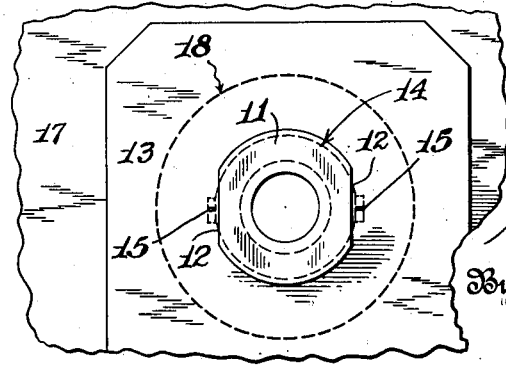
Figure 3 is a section on line 3—3 of Fig. 2, parts being omitted.

The bladder is put into the cover through the laced opening and the stem 20 is screwed into the attaching bushing to the position shown in Fig. 1. The opening is then tightly laced and the ball is inflated through the stem 20. After the ball has been inflated the end of the stem is closed by a cap 21 which carries a sealing washer 22. The outer surface of cap 21 fits practically flush with the surface of the ball, thereby completely filling the opening 19. Slots 23 formed in the cap provide for its ready removal by means of a key or any flat blade.

While the invention has been illustrated on a basket-ball it will be clear that it is suitable for use on a foot-ball, or any other type of playing ball. By eliminating the rubber inflating stem and preventing shifting of the bladder the useful life of the bladder is materially lengthened. At the same time the bulging resulting from a rubber stem is eliminated and any unevenness is avoided. Inflation is rendered so easy that the ball can be kept tight at all times with a minimum of effort.

What we claim is:

1. In a playing ball, a cover, a bladder within said cover, an interiorly and exteriorly threaded valve stem carried by the bladder, a bushing carried by the cover and interiorly threaded to engage the exterior threads of the valve stem, and means for preventing rotation of the bushing relatively to the cover.

2. The combination set forth in claim 1, in which the bushing carries a flange and in which there is included an anchor washer having prongs that pierce the cover and engage the flange of the bushing to prevent rotation thereof relatively to the cover.

In testimony whereof we affix our signatures.

GEORGE L. PIERCE.
HENRY V. RAU.